US012665916B2

(12) United States Patent  (10) Patent No.: US 12,665,916 B2
Kim et al.  (45) Date of Patent: Jun. 23, 2026

(54) LIGHTWEIGHT REAL-TIME ABNORMALITY DETECTION METHOD USING CAN MESSAGE ANALYSIS AND NEURAL NETWORK MODEL

(71) Applicant: KOREA UNIVERSITY RESEARCH AND BUSINESS FOUNDATION, Seoul (KR)

(72) Inventors: Huy Kang Kim, Seoul (KR); Seonghoon Jeong, Seoul (KR); Hwejae Lee, Seoul (KR); Sangho Lee, Seoul (KR); Yeonjae Kang, Namyangju-si (KR); Daekwon Pi, Goyang-si (KR); Gunho Park, Suwon-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 117 days.

(21) Appl. No.: 18/715,263

(22) PCT Filed: Nov. 3, 2022

(86) PCT No.: PCT/KR2022/017082
§ 371 (c)(1),
(2) Date: May 31, 2024

(87) PCT Pub. No.: WO2023/106638
PCT Pub. Date: Jun. 15, 2023

(65) Prior Publication Data
US 2025/0039206 A1     Jan. 30, 2025

(30) Foreign Application Priority Data

Dec. 8, 2021    (KR) ........................ 10-2021-0174328

(51) Int. Cl.
*H04L 9/40* (2022.01)
*G06N 3/0495* (2023.01)

(52) U.S. Cl.
CPC ....... *H04L 63/1425* (2013.01); *G06N 3/0495* (2023.01)

(58) Field of Classification Search
USPC ...................................................... 726/22–25
See application file for complete search history.

(56) References Cited

U.S. PATENT DOCUMENTS 9,843,594 B1 * 12/2017 Evans ................. H04L 63/1425
10,015,462 B1 * 7/2018 Quach ................. H04N 9/8042
(Continued)

FOREIGN PATENT DOCUMENTS

| | | |
|---|---|---|
| JP | 6740247 B2 | 8/2020 |
| KR | 10-1428989 B1 | 8/2014 |

(Continued)

OTHER PUBLICATIONS

Paul et al.; An Artificial Neural Network Based Anomaly Detection Method in CAN Bus Messages in Vehicles; 2021 International Conference on Automation, Control and Mechatronics for Industry 4.0 (ACMI), Jul. 8-9, 2021, Rajshahi, Bangladesh (Year: 2021).*

(Continued)

*Primary Examiner* — Teshome Hailu
*Assistant Examiner* — Mahabub S Ahmed
(74) *Attorney, Agent, or Firm* — Hauptman Ham, LLP

(57) ABSTRACT

A method for detecting an anomaly, which is performed by a computing device including one or more processors according to some embodiments of the present disclosure may include: collecting a CAN message generated in a controller area network (CAN); generating first traffic time interval data and first payload data based on the CAN message; obtaining a first latent vector generated by input- (Continued)

ting the first traffic time interval data into a first neural network model; obtaining a second latent vector generated by inputting the first payload data into a second neural network model; generating merged data in which the first latent vector and the second latent vector are merged; and determining whether the CAN message is anomalous by inputting the merged data into a third neural network model.

12 Claims, 14 Drawing Sheets

(56) References Cited

U.S. PATENT DOCUMENTS

| | | | | |
|---|---|---|---|---|
| 10,482,334 | B1* | 11/2019 | Chen | G06N 3/084 |
| 10,484,401 | B2 | 11/2019 | Jung et al. | |
| 11,095,618 | B2* | 8/2021 | Doshi | G06F 21/14 |
| 11,294,756 | B1* | 4/2022 | Sadrieh | G06F 11/079 |
| 11,438,248 | B2 | 9/2022 | Park et al. | |
| 11,483,327 | B2* | 10/2022 | Hen | H04L 63/104 |
| 11,606,376 | B2* | 3/2023 | Wee | H04L 63/1425 |
| 11,610,098 | B2* | 3/2023 | Dong | G06F 18/241 |
| 11,700,270 | B2* | 7/2023 | Mozumdar | H04L 12/40013 |
| | | | | 726/23 |
| 11,973,769 | B1* | 4/2024 | Le | H04L 63/1425 |
| 12,266,144 | B2* | 4/2025 | Mustikovela | G06V 10/242 |
| 12,406,023 | B1* | 9/2025 | Alvarez Lopez | G06F 18/2148 |
| 2003/0177391 | A1* | 9/2003 | Ofek | H04L 47/193 |
| | | | | 713/176 |
| 2016/0188396 | A1* | 6/2016 | Sonalker | G06F 11/079 |
| | | | | 714/37 |
| 2017/0126711 | A1* | 5/2017 | Jung | H04L 63/1416 |
| 2018/0336436 | A1* | 11/2018 | Cheng | G06F 18/2433 |
| 2019/0102840 | A1* | 4/2019 | Perl | G06Q 40/08 |
| 2019/0135300 | A1* | 5/2019 | Gonzalez Aguirre | |
| | | | | B60W 50/0205 |
| 2019/0303759 | A1* | 10/2019 | Farabet | G06N 3/063 |
| 2019/0385057 | A1* | 12/2019 | Litichever | G06N 3/08 |
| 2020/0076840 | A1* | 3/2020 | Peinador | G06N 3/045 |
| 2020/0090426 | A1* | 3/2020 | Barnes | G06N 5/025 |
| 2020/0143053 | A1* | 5/2020 | Gutierrez | G06F 21/554 |
| 2020/0145433 | A1* | 5/2020 | Gutierrez | G06N 3/0985 |
| 2020/0204571 | A1* | 6/2020 | Neznal | G06N 3/044 |
| 2020/0234101 | A1* | 7/2020 | Hanselmann | G06N 3/0455 |
| 2020/0267171 | A1 | 8/2020 | Mozumdar et al. | |
| 2020/0287926 | A1* | 9/2020 | Liu | G06N 3/0464 |
| 2020/0389469 | A1* | 12/2020 | Litichever | H04W 12/12 |
| 2021/0051085 | A1* | 2/2021 | Park | G06N 3/044 |
| 2021/0150230 | A1* | 5/2021 | Smolyanskiy | G06V 10/803 |
| 2021/0178995 | A1* | 6/2021 | Koyama | H04L 63/1433 |
| 2021/0185066 | A1* | 6/2021 | Shah | G06N 3/0475 |
| 2021/0188252 | A1* | 6/2021 | Lu | B60W 40/12 |
| 2022/0038903 | A1* | 2/2022 | Fu | H04W 12/106 |
| 2022/0044121 | A1* | 2/2022 | Pituwalakankanamge | |
| | | | | G06N 3/08 |
| 2022/0046114 | A1* | 2/2022 | Entelis | H04L 69/04 |
| 2022/0084371 | A1* | 3/2022 | Semichev | G06N 3/045 |
| 2022/0150141 | A1* | 5/2022 | Reinert | H04L 12/40013 |
| 2022/0166782 | A1* | 5/2022 | Zoldi | G06Q 20/4016 |
| 2022/0269937 | A1* | 8/2022 | Kim | G06N 3/08 |
| 2022/0303362 | A1* | 9/2022 | Kamir | G06F 13/36 |
| 2022/0309336 | A1* | 9/2022 | Minkin | G06F 17/16 |
| 2022/0318678 | A1* | 10/2022 | Kranski | G06N 20/00 |
| 2022/0366734 | A1* | 11/2022 | Jung | G07C 5/0808 |
| 2022/0374515 | A1* | 11/2022 | Bridges | G06F 21/554 |
| 2022/0374657 | A1* | 11/2022 | Pandey | G06V 10/82 |
| 2022/0383421 | A1* | 12/2022 | Grivel | B60W 40/09 |
| 2023/0054575 | A1* | 2/2023 | Cohen | G06F 21/556 |
| 2023/0114810 | A1* | 4/2023 | Li | G06N 3/045 |
| | | | | 370/235 |
| 2023/0182725 | A1* | 6/2023 | Li | B60W 30/0956 |
| | | | | 701/301 |
| 2023/0188553 | A1* | 6/2023 | Wee | H04L 63/1425 |
| | | | | 726/22 |
| 2023/0283622 | A1* | 9/2023 | Vu | H04L 63/1416 |
| | | | | 726/1 |
| 2024/0411864 | A2* | 12/2024 | Stein | G06N 3/04 |
| 2025/0216934 | A1* | 7/2025 | Kim | G06V 20/46 |

FOREIGN PATENT DOCUMENTS

| | | |
|---|---|---|
| KR | 10-1714520 B1 | 3/2017 |
| KR | 10-2181762 B1 | 11/2020 |
| KR | 10-2204656 B1 | 1/2021 |
| KR | 10-2232871 B1 | 3/2021 |
| KR | 10-2021-0043053 A | 4/2021 |

OTHER PUBLICATIONS

Andrew John Tomlinson; Detecting Cyber Attacks on the Automotive Controller Area Network; Faculty of Engineering, Environment and Computing Institute for Future Transport and Cities; (Year: 2019).*

Zhou et al., Anomaly Detection of CAN Bus Messages Using a Deep Neural Network for Autonomous Vehicles; (Year: 2019).*

Vinayak Tanksale; Anomaly Detection for Controller Area Networks Using Long Short-Term Memory; (Year: 2020).*

Tahsn C. M. Dönmez; Anomaly Detection in Vehicular CAN Bus Using Message Identifier Sequences; (Year: 2021).*

Qin et al; Application of Controller Area Network (CAN) bus anomaly detection based on time series prediction; (Year: 2021).*

Novikova et al.; Autoencoder Anomaly Detection on Large CAN Bus Data (Year: 2020).*

Tariq et al.; CANTransfer—Transfer Learning based Intrusion Detection on a Controller Area Network using Convolutional LSTM Network (Year: 2020).*

Zhu et al.; Mobile Edge Assisted Literal Multi-Dimensional Anomaly Detection of In-Vehicle Network Using LSTM; IEEE Transactions on Vehicular Technology, vol. 68, No. 5, May 2019 (Year: 2019).*

International Search Report issued on Feb. 8, 2023 for corresponding International Patent Application No. PCT/KR2022/017082, along with an English translation (4 pages).

Written Opinion issued on Feb. 8, 2023 for corresponding International Patent Application No. PCT/KR2022/017082 (3 pages).

Seunghyun Park et al., "Hierarchical Anomaly Detection Model for In-Vehicle Networks Using Machine Learning Algorithms", Sensors, vol. 20, Jul. 15, 2020, pp. 1-21.

Markus Hanselmann, "CANet: An Unsupervised Intrusion Detection System for High Dimensional CAN Bus Data", IEEE Access, vol. 8, Mar. 23, 2020, pp. 58194-58205.

\* cited by examiner

LIGHTWEIGHT REAL-TIME ABNORMALITY DETECTION METHOD USING CAN MESSAGE ANALYSIS AND NEURAL NETWORK MODEL

CROSS REFERENCE TO RELATED APPLICATION

This application is a National Stage of International Application No. PCT/KR2022/017082, filed on Nov. 3, 2022, which is based upon and claims the benefit of priority to Korean Patent Application No. 10-2021-0174328, filed on Dec. 8, 2021, in the Korean Intellectual Property Office. All of the aforementioned applications are hereby incorporated by reference in their entireties.

TECHNICAL FIELD

The present disclosure relates to a method for detecting an anomaly, and more particularly, to a method for detecting an anomaly using analysis of a CAN message and a neural network model.

BACKGROUND ART

Controller Area Network (CAN) is a communication standard developed in 1983 and is currently used in most internal vehicle communications, and based on the advantages of stability and low cost, the CAN is also used for internal communication in various cyber physical systems (CPS).

Because the CAN system in vehicles in the past was a closed system not connected to the outside, security was not considered in the protocol design. In recent years, vehicles are connected to the outside through new environments such as V2V (vehicle-to-vehicle) and V2X (vehicle-to-everything), and security issues occur.

Existing machine learning-based anomaly detection technology has a limitation in that the technology can only detect types of attacks input as learning data when creating a detection model.

In addition, although the protocol specifications of CAN itself are all known, the format of the data field area within the CAN message is different depending on the vehicle manufacturer and model. Since the format for each manufacturer and vehicle model is not easily disclosed, model creation through existing machine learning methods must be created differently for each manufacturer and vehicle model, and learning data must also be configured separately.

Therefore, there is a need for research and development on a method that can determine whether a CAN message is anomalous even when there is no specific learning data. As a document related thereto, Korean Patent Registration No. 10-2204656 (registered on Jan. 13, 2021) is contrived.

DISCLOSURE

Technical Problem

The present disclosure is contrived in response to the background art, and has been made in an effort to provide a method for detecting an anomaly by using analysis of a CAN message and a neural network model.

Technical objects of the present disclosure are not restricted to the technical object mentioned as above. Other unmentioned technical objects will be apparently appreciated by those skilled in the art by referencing the following description.

Technical Solution

In order to achieve the object, according to some embodiments of the present disclosure, a method for detecting an anomaly, which is performed by a computing device including one or more processors, may include: collecting a CAN message generated a controller area network (CAN); generating first traffic time interval data and first payload data based on the CAN message; obtaining a first latent vector generated by inputting the first traffic time interval data into a first neural network model; obtaining a second latent vector generated by inputting the first payload data into a second neural network model; generating merged data in which the first latent vector and the second latent vector are merged; and determining whether the CAN message is anomalous by inputting the merged data into a third neural network model.

Alternatively, the generating of the first traffic time interval data and the first payload data may include extracting an Arbitration ID from the CAN message, extracting a value of a reception time interval of the CAN message from the CAN message, and generating the first traffic time interval data including the Arbitration ID and the reception time interval value of the CAN message.

Alternatively, the generating of the first traffic time interval data and the first payload data may include extracting the Arbitration ID from the CAN message, extracting a payload from the CAN message, generating payload analysis data by analyzing the payload, and generating the first payload data including the Arbitration ID and the payload analysis data.

Alternatively, the generating of the payload analysis data by analyzing the payload may include checking the amount of change in the payload using at least one of Hamming Distance, Autocorrelation, or Time Series Decomposition, obtaining payload separation information separated by use or unit by analyzing the amount of change in the payload, and generating the payload analysis data including the payload separation information.

Alternatively, the generating of the merged data in which the first latent vector and the second latent vector are merged may include generating a first adjusted latent vector in which a first weight is assigned to the first latent vector, generating a second adjusted latent vector in which a second weight is assigned to the second latent vector, and generating the merged data in which the first adjusted latent vector and the second adjusted latent vector are merged.

Alternatively, first weight may be determined based on a training result of the first neural network model trained based on second traffic time interval data generated based on a normal CAN message.

Alternatively, the second weight may be determined based on a training result of the second neural network model trained based on second payload data generated based on the normal CAN message.

Alternatively, the third neural network model may include an encoder unit compressing the input merged data, and generating a third latent vector of which dimension is reduced, a decoder unit generating first output data in which the third latent vector is converted to a dimension before reduction, and a discriminator generating second output data based on a target vector extracted from a target distribution, and the third latent vector.

Alternatively, the determining of whether the CAN message is anomalous by inputting the merged data into the third neural network model may include calculating a loss value of the third neural network model by comparing the merge data and the second output data, and determining whether the CAN message is anomalous based on the loss value and a predetermined threshold.

Alternatively, the method may further include: in which at least one of the first neural network model, the second neural network model, or the third neural network model is pre-trained, performing quantization of converting a floating point arithmetic process performed in at least one of the first neural network model, the second neural network model, or the third neural network model into an integer arithmetic process.

Alternatively, third neural network model as a model in which Variational Auto-Encoder (VAE) and Generative Adversarial Networks (GAN) are combined may be pre-trained so that a posterior distribution of a hidden code vector of the VAE matches a target distribution.

In order to achieve the object, according to some another embodiments of the present disclosure, in a computer program storing a computer readable storage medium, the computer program may comprise instructions for causing a processor of a computing device for detecting an anomaly to perform the following steps, and the steps may include: collecting a CAN message generated in a controller area network (CAN); generating first traffic time interval data and first payload data based on the CAN message; obtaining a first latent vector generated by inputting the first traffic time interval data into a first neural network model; obtaining a second latent vector generated by inputting the first payload data into a second neural network model; generating merged data in which the first latent vector and the second latent vector are merged; and determining whether the CAN message is anomalous by inputting the merged data into a third neural network model.

In order to achieve the object, according to some yet other embodiments of the present disclosure, a computing device for detecting an anomaly may include: a processor including at least one core; a memory for storing computer programs executable by the processor; and a network unit, and the processor may be configured to collect a CAN message generated in a controller area network (CAN), generate first traffic time interval data and first payload data based on the CAN message, obtain a first latent vector generated by inputting the first traffic time interval data into a first neural network model, obtain a second latent vector generated by inputting the first payload data into a second neural network model, generate merged data in which the first latent vector and the second latent vector are merged, and determine whether the CAN message is anomalous by inputting the merged data into a third neural network model.

Advantageous Effects

According to the present disclosure, the anomaly can be detected by using analysis of a CAN message and a neural network model.

Effects which can be acquired in the present disclosure are not limited to the aforementioned effects and other unmentioned effects will be clearly understood by those skilled in the art from the following description.

DESCRIPTION OF DRAWINGS

Various aspects are now described with reference to the drawings and like reference numerals are generally used to designate like elements. In the following embodiments, for purposes of explanation, numerous specific details are set forth to provide a comprehensive understanding of one or more aspects. However, it will be apparent that the aspect(s) can be executed without the detailed matters.

BEST MODE

Figure 1:
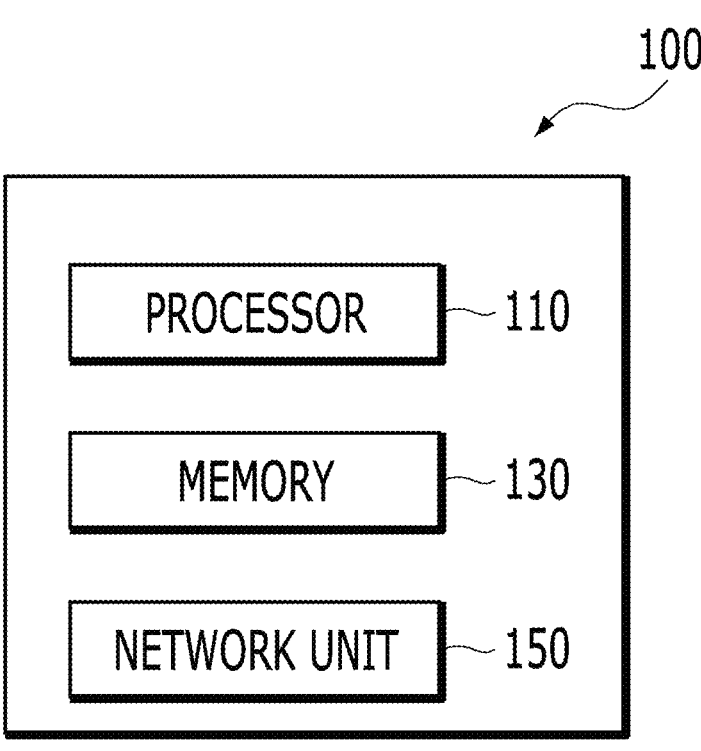
FIG. 1 is a block diagram of a computing device performing an operation for providing a method for detecting an anomaly according to some embodiments of the present disclosure.

Various embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Moreover, the term "or" is intended to mean not exclusive "or" but inclusive "or". That is, when not separately specified or not clear in terms of a context, a sentence "X uses A or B" is intended to mean one of the natural inclusive replacements. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

Further, it should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

In addition, the term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device performing an operation for providing a method for detecting an anomaly according to some embodiments of the present disclosure.

A configuration of the computing device 100 illustrated in FIG. 1 is only an example shown through simplification. In an embodiment of the present disclosure, the computing device 100 may include other components for performing a computing environment of the computing device 100, and only some of the disclosed components may also constitute the computing device 100.

The computing device 100 according to some embodiments of the present disclosure may be a device for determining whether there is an anomaly of a CAN message generated in a controller area network (CAN). The computing device 100 may be a device for determining whether the CAN message is anomalous using a neural network model. In addition, when the anomaly is present in the CAN message, the computing device 100 may recognize a device (e.g., a vehicle, etc.) using the corresponding CAN collecting the CAN message as being in a dangerous state, and transmit a danger alarm signal to an external device (e.g., a terminal of a vehicle user, etc.).

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an embodiment of the present disclosure. According to an embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

According to some embodiments of the present disclosure, the memory 130 may store any type of information generated or determined by the processor 110 or any type of information received by the network unit 150.

According to some embodiments of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

In respect to the network unit 150 according to some embodiments of the present disclosure, an arbitrary wired/wireless communication network that may transmit/receive arbitrary type data and signals may be included in the network expressed in the present disclosure.

The techniques described in this specification may also be used in other networks in addition to the aforementioned networks.

Figure 2:
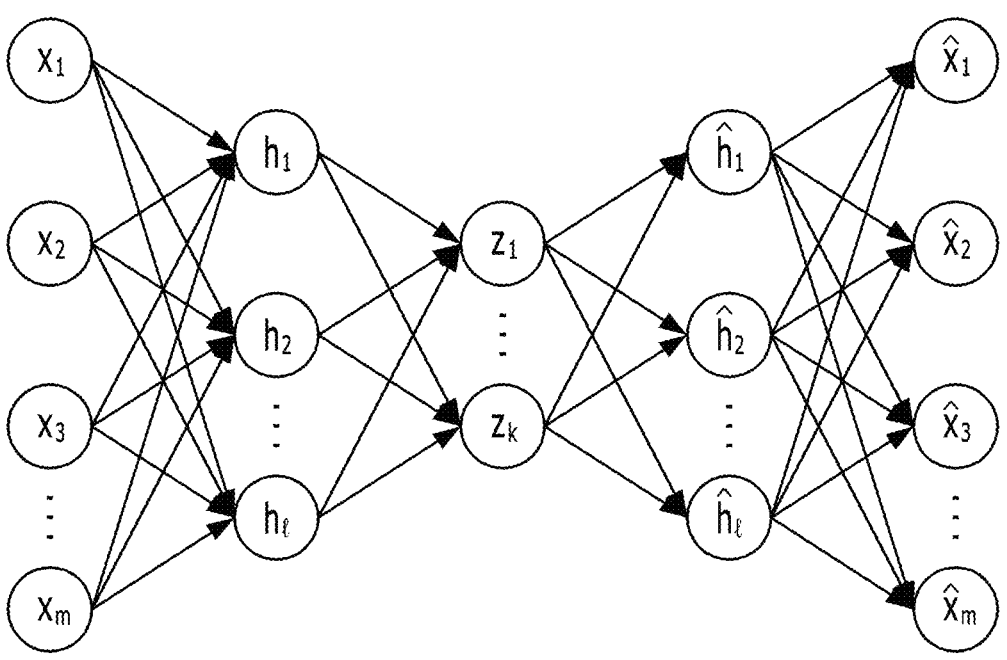
FIG. 2 is a schematic view illustrating a neural network model according to some embodiments of the present disclosure.

FIG. 2 is a schematic view illustrating a neural network model according to some embodiments of the present disclosure.

Throughout the present specification, a computation model, the neural network, a neural network model, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded to the output layer (symmetrical to the input layer) symmetrical to reduction in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Over-fitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be an example of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Disclosed is a computer readable medium storing the data structure according to an embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a dequeue. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The dequeue may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a neural network model, a network function, and the neural network may be used as the same meaning. Hereinafter, the computation model, the neural network, a neural network model, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a predetermined combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes.

The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency in the operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

The configuration of the processor 110 for determining whether the CAN message is anomalous by using the neural network model described through FIGS. 1 and 2 will be described later with reference to FIG. 3.

Figure 3:
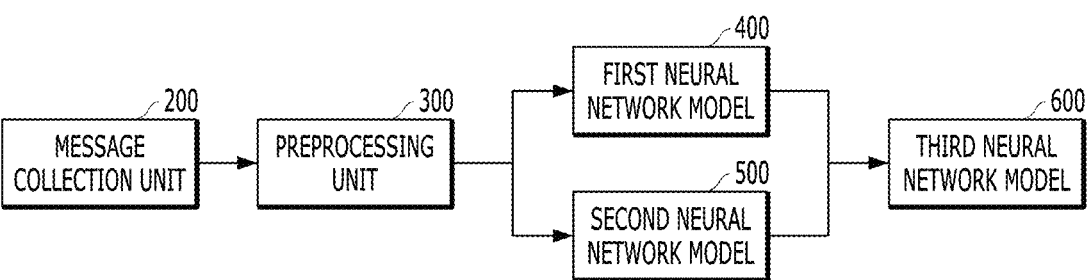
FIG. 3 is a block diagram of a processor of a computing device for describing a method for detecting an anomaly according to some embodiments of the present disclosure.

FIG. 3 is a block diagram processor of a computing device for describing a method for detecting an anomaly according to some embodiments of the present disclosure.

Referring to FIG. 3, the processor 110 of the computing device 100 may include a message collection unit 200, a preprocessing unit 300, a first neural network model 400, a second neural network model 500, and a third neural network model 600. However, components described above are not required in implementing the processor 110 and the processor 110 may thus have components more or less than components listed above.

The message collection unit 200 may collect a CAN message generated in the CAN. Specifically, the message collection unit 200 may collect the CAN message by sniffing traffic generated on a bus of the CAN.

The CAN may be a communication standard developed to perform communication including data transmission and reception between systems connected through the bus.

A structure of the CAN may be a structure in which nodes (e.g., a vehicle safety system, a vehicle convenience feature system, etc.) constituting a specific system (e.g., a vehicle system, an automation device system, a medical equipment system, etc.) are connected through the bus.

In the CAN, the respective nodes as masters may be connected in parallel, and may operate in a multi-master scheme in which all nodes are accessible to transmitted and received data.

In the CAN, when the nodes transmit data to each other, the bus may mean an electrical path which is commonly used.

The CAN message as the message generated by the CAN may be a message generated for each of the systems included in the CAN to transmit data. The configuration of the CAN message will be described later with reference to FIG. 4.

Figure 4:
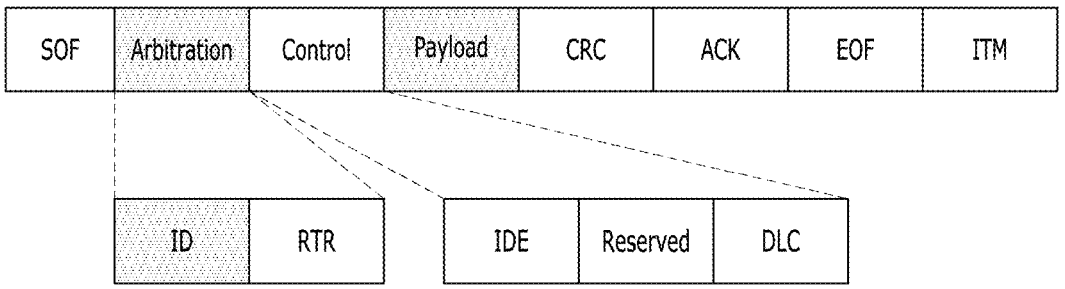
FIG. 4 is a diagram for describing a configuration of a CAN message according to some embodiments of the present disclosure.

FIG. 4 is a diagram for describing a configuration of a CAN message according to some embodiments of the present disclosure.

Referring to FIG. 4, the CAN message may have a form in which a plurality of fields are divided and connected. The plurality of fields may include a start of frame (SOF) field, an arbitration field, a control field, a payload field, a cyclic redundancy check (CRC) field, an acknowledgment (ACK) field, an end of frame (EOF) field, and intermission (ITM) field. However, the above-described components are not essential in implementing the CAN message, and the CAN message may have more or less components than the components listed above.

The start of frame (SOF) field may consist of 1 bit, and indicate the start of the CAN message. Therefore, the start of frame (SOF) field may synchronize all nodes connected to the bus by notifying all nodes connected to the bus that message transmission is started.

The arbitration field may include an Arbitration ID and a remote transmission request (RTR).

The Arbitration ID may consist of 11 bits or 18 bits, and may be an identifier of the CAN message. The Arbitration ID may be a value for determining a priority. For example, the CAN message may have the priority the smaller the Arbitration ID value is. However, the CAN message is not limited thereto, and may also have the priority the larger the Arbitration ID value is.

The RTR may consist of 1 bit, and when a first CAN message which is a data frame, and a second CAN message which is a remote frame, which are transmitted at the same time have the same Arbitration ID, the RTR may be a value for determining the priority. The data frame may mean a structure including the payload field. The remote frame may mean a structure not including the payload field. For example, when a value of the RTR is '0', the corresponding CAN message may be recognized as the data frame. When the value of the RTR is '1', the corresponding CAN message may be recognized as the remote frame.

Accordingly, between the first CAN message and the second CAN message which are transmitted at the same time, the case where the value of the RTR is '0' is determined as the priority to recognize the first CAN message as the priority.

The control field may include identifier extension (IDE), Reserved, and data length code (DLC).

The IDE may consist of 1 bit, and may be a value for distinguishing a standard CAN message which is the type of corresponding CAN message and an extended CAN message. The standard CAN message may be a CAN message in which the Arbitration ID is 11 bits. The extended CAN message may be a message in which the Arbitration ID is 18 bits. For example, when a value of the IDE is 0, the corresponding CAN message may be determined as the standard CAN message. In addition, when the value of the IDE is 1, the corresponding CAN message may be determined as the extended CAN message.

Reserved may consist of two 1 bits (e.g., r0 and r1), and may be a value used when the Arbitration ID is extended (e.g., 29 bits, etc.) later. For example, when Reserved is used in another communication network other than the CAN, Reserved may be used to extend the Arbitration ID to correspond to another communication network.

Data length code (DLC) may consist of 4 bits, and may be a value indicating a length of data included in the payload field.

The payload field may consist of 0 to 64 bits, and may include a payload which is a value of actual data which is transmitted.

The cyclic redundancy check field may include a CRC sequence and a CRC delimiter.

The CRC sequence may consist of 15 bits, and may be a value calculated based on a specific algorithm in a transmission node. Accordingly, a reception node calculates a value of the CRC sequence based on the specific algorithm to determine whether there is a bit error in the CAN message.

The CRC delimiter may consist of 1 bit, and may indicate the end of the CRC field.

The ACK field may include an ACK slot and an ACK delimiter.

The ACK slot may consist of 1 bit, and may be a value for determining whether normal reception of the CAN message is completed. For example, according to a check result of the CRC sequence, when it is determined that the CAN message is normally received, the ACK slot may include a value of '0'. In addition, according to the check result of the CRC sequence, when it is determined that the CAN message is anomalously received, the ACK slot may include a value of '1'.

The CRC delimiter may consist of 1 bit, and may indicate the end of the ACK field.

The end of frame (EOF) field may consist of 7 bits, and indicate the end of the frame of the CAN message. For example, the end of frame field may consist of '1111111' which is 7 bits.

The intermission field may consist of 3 bits, and may be a buffer area for smoothly performing transmission and reception of the CAN message between nodes.

Referring back to FIG. 3, the preprocessing unit 300 may perform preprocessing the CAN message collected by the message collection unit 200 to be used in the neural network. A configuration of the preprocessing unit 300 will be described later with reference to FIG. 5.

Figure 5:
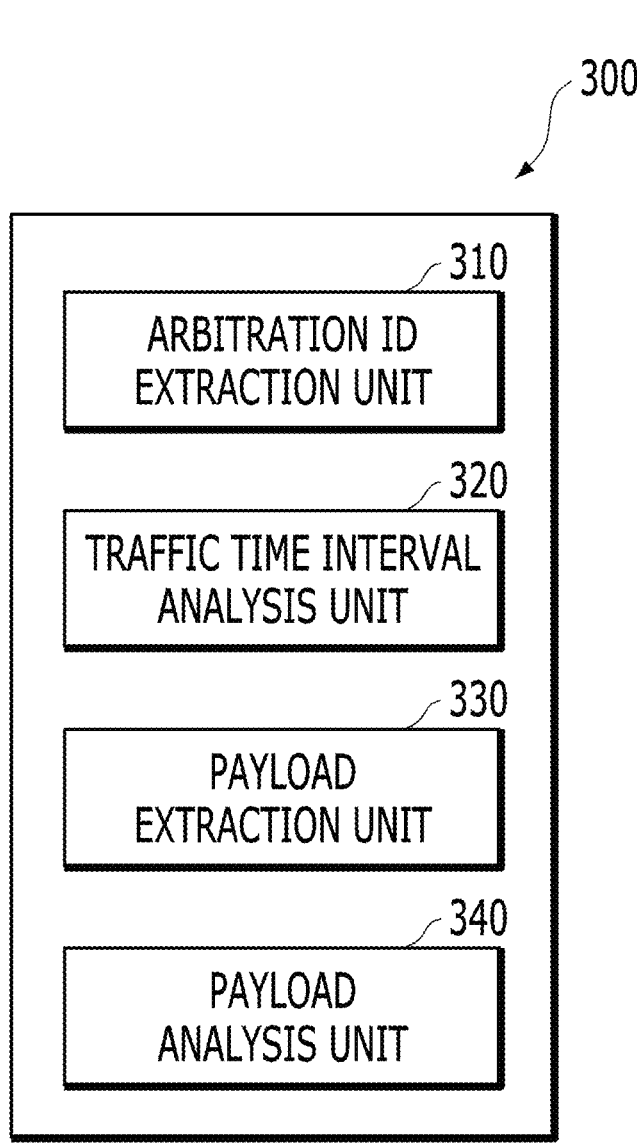
FIG. 5 is a block diagram for describing a preprocessing unit according to some embodiments of the present disclosure.

FIG. 5 is a block diagram for describing a preprocessing unit according to some embodiments of the present disclosure.

Referring to FIG. 5, the preprocessing unit 300 may include an Arbitration ID extraction unit 310, a traffic time interval analysis unit 320, a payload extraction unit 330, and a payload analysis unit 340. However, components described above are not required in implementing the pre-processing unit 300 and the preprocessing unit 300 may have components more or less than components listed above.

The Arbitration ID extraction unit 310 may extract the Arbitration ID from the CAN message collected by the message collection unit 200. For example, the Arbitration ID extraction unit 310 may identify the Arbitration field of the CAN message, and extract the Arbitration ID included in the Arbitration field.

The traffic time interval analysis unit 320 may extract a value of a reception time interval of the CAN message corresponding to the Arbitration ID extracted by the Arbitration ID extraction unit 310.

Specifically, the traffic time interval analysis unit 320 extracts the value of the reception time interval of the CAN message based on a time difference between the currently collected first CAN message and the previously collected second CAN message with the same Arbitration ID. For example, the computing device 100 may receive a first CAN message with an Arbitration ID of 0x35C at 1.0001 seconds and a second CAN message with an Arbitration ID of 0x35C at 1.0031 seconds. In this case, the traffic time interval analysis unit 320 may calculate the value of the reception time interval of the CAN message of 0x35C as 0.003 seconds.

Therefore, the preprocessing unit 300 may generate traffic time interval data for each Arbitration ID, including the above-described Arbitration ID and the reception time interval value of the CAN message. For example, the preprocessing unit 300 may generate the traffic time interval data for each Arbitration ID as in Table 1 below.

TABLE 1

| Arbitration ID | First reception time interval value | Second reception time interval value | Third reception time interval value |
|---|---|---|---|
| 0x35C | 0.003 | 0.0031 | 0.003 |
| 0x57A | 0.025 | 0.023 | 0.024 |
| 0x133 | 0.13 | 0.15 | 0.14 |

The processor 110 stores the traffic time interval data generated by the preprocessing unit 300 in the memory 130 of the computing device 100, as in Table 1 above, and uses the traffic time interval data as training data for training the first neural network model 400. For example, the processor 110 may use normal traffic time interval data generated from a CAN message in a normal state as the training data for training the first neural network model 400. The preprocessing unit 300 may generate the traffic time interval data in a vector form. Meanwhile, the processor 110 may determine whether the CAN message is anomalous based on the traffic time interval data generated by the preprocessing unit 300. A method for determining whether the CAN message is anomalous based on the generated traffic time interval data will be described later with reference to FIG. 6.

Figure 6:
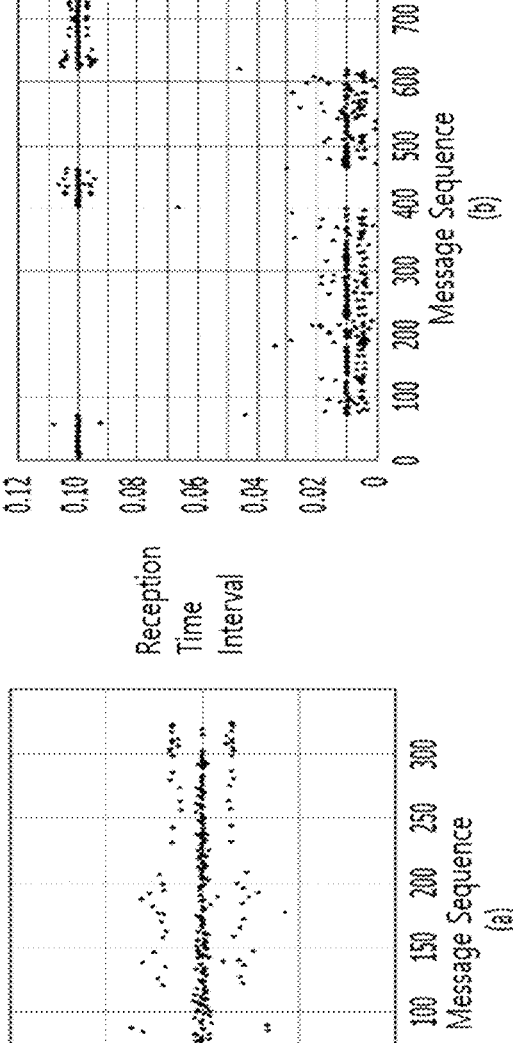
FIG. 6 is a diagram illustrating a result of measuring a traffic time interval according to some embodiments of the present disclosure.

FIG. 6 is a diagram illustrating a result of measuring a traffic time interval according to some embodiments of the present disclosure.

Referring to FIG. 6, FIG. 6A and FIG. 6B are diagrams illustrating traffic time interval data measured for a predetermined time. Referring to FIG. 6A, it can be seen that values of the reception time interval of the CAN message are formed within an error range of 0.01 seconds based on 0.1 second. Accordingly, the processor 110 may determine that the corresponding CAN message is in a normal state.

Referring to FIG. 6B, it can be seen that a section is formed in which the values of the reception time interval of the CAN message show a large difference from each other. Accordingly, the processor 110 may determine that the corresponding CAN message is in an abnormal state.

As described above with reference to FIG. 6, the processor 110 may determine whether the corresponding CAN message is normal based on the value of the reception time interval of the CAN message. Further, the processor 110 may control the network unit 150 to send a notification to an external device when the CAN message is in the abnormal state.

Referring back to FIG. 5, the payload extraction unit 330 may extract the payload from the CAN message collected by the message collection unit 200. For example, the payload extraction unit 330 may identify the payload field of the CAN message, and extract the payload included in the payload field.

The payload analysis unit 340 may generate payload analysis data by analyzing the payload extracted by the payload extraction unit 330. For example, the payload analysis unit 340 may check the amount of change in the payload using at least one of Hamming Distance, Autocorrelation, or Time Series Decomposition.

The Hamming distance may mean the number of bits in which corresponding bits of transmitted data and receive data are different from each other. Therefore, the payload analysis unit 340 may check the amount of change in the payload by using the Hamming distance which is the number of bits in which corresponding bits of a current payload and a payload included in a previous CAN message (the same as the Arbitration ID of the CAN message including the current payload) are different from each other.

The autocorrelation may mean how current data is related to previous data in time series data composed of vectors divided into the same time interval. Therefore, the payload analysis unit 340 may check the amount of change in the payload by checking a correlation through comparison of the current payload and the payload included in the previous CAN message (the same as the Arbitration ID of the CAN message including the current payload).

The time series decomposition may mean expressing a change in observation value over time as a function, and estimating a future value through the function. Accordingly, the payload analysis unit 340 may check the amount of change in the payload by estimating the future value through the current payload.

The amount of change in payload checked using at least one of the above-described Hamming distance, autocorrelation, or time series decomposition will be described later with reference to FIG. 7.

Figure 7:
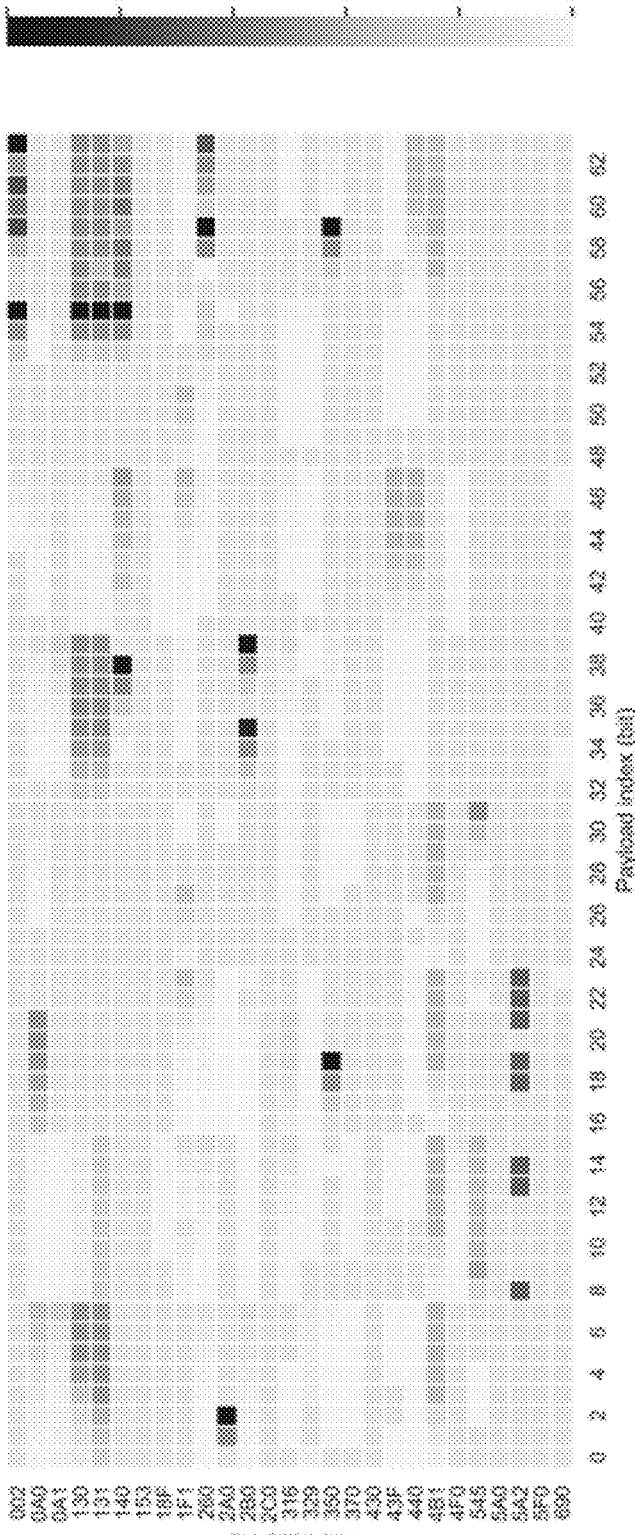
FIG. 7 is a diagram illustrating a payload index for an arbitration ID according to some embodiments of the present disclosure.

FIG. 7 is a diagram illustrating a payload index for an arbitration ID according to some embodiments of the present disclosure.

Referring to FIG. 7, the payload analysis unit 340 may check a payload index indicating what value each bit has between 0 and 1 for each arbitration ID and display the payload index in a graph.

Accordingly, the payload analysis unit 340 may check the amount of change in bits for each Arbitration ID based on the payload index indicating what value each bit has between 0 and 1 for each arbitration ID.

Referring back to FIG. 5, the payload analysis unit 340 may analyze the amount of change in the payload and obtain payload separation information separated by use or unit.

The payload analysis unit 340 may separate the payload by use based on the preset use for each bit of the payload and obtain the payload separation information. For example, the payload analysis unit 340 may select bits corresponding to patterns for each preset use from the change amount of the payload and obtain payload separation information separated by use.

In addition, the payload analysis unit 340 may obtain the payload separation information separated by unit. The detailed description thereof will be described below with reference to FIG. 8.

Figure 8:
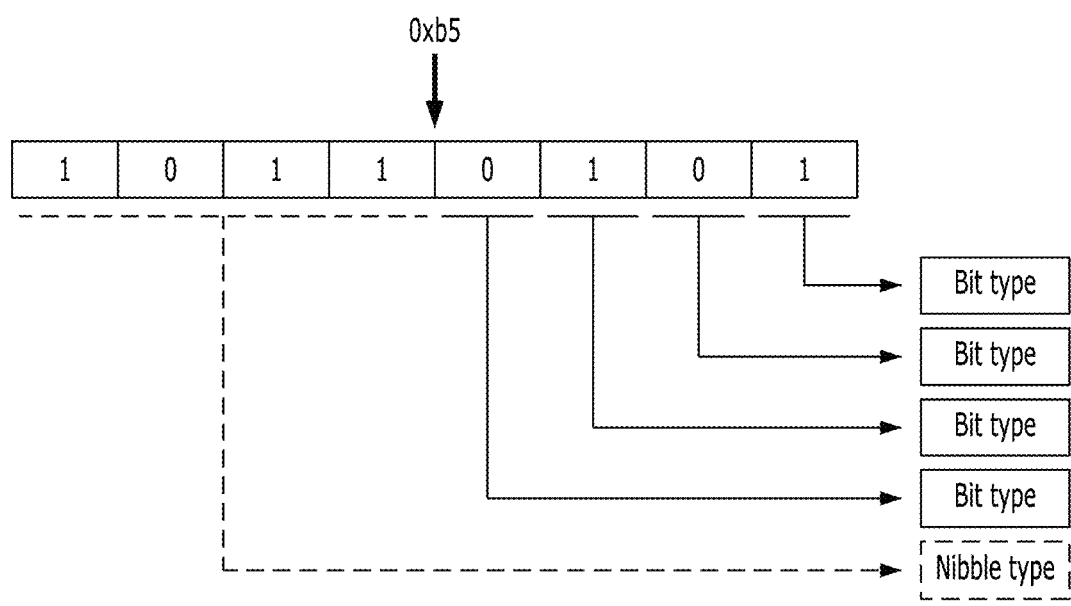
FIG. 8 is a diagram illustrating unit-specific separation of a payload according to some embodiments of the present disclosure.

FIG. 8 is a diagram illustrating unit-specific separation of a payload according to some embodiments of the present disclosure.

Referring to FIG. 8, the payload analysis unit 340 may check the amount of change in the payload and classify it into units such as bits, nibble (4 bits), and byte (8 bits). For example, the payload analysis unit 340 may separate the payload by the nibble unit when 4 bits are in a multiple relationship among 8 bits constituting 1 byte of the payload of the CAN message.

As another example, if the payload analysis unit 340 determines that among the 8 bits constituting 1 byte of the payload of the CAN message, the amounts of change in a first bit and a second bit are different and are not related to each other, a meaning may also be separated by the unit of the bit.

In addition, the payload analysis unit 340 may generate payload analysis data including the payload separation information obtained through the above-described process. The processor 110 may store the payload analysis data in the memory 130, and use the payload analysis data as training data for training the second neural network model 500. For example, the processor 110 may use the payload analysis data extracted from the CAN message which is in the normal state as the training data for training the second neural network model 500. The payload analysis unit 340 may generate the payload analysis data in the vector form.

Referring back to FIG. 3, the first neural network model 400 may be trained using normal traffic time interval data generated based on the CAN message in the normal state through the preprocessing unit 300 as the training data. For example, the first neural network model 400 may be continuously trained based on new CAN messages continuously collected through the message collection unit 200, rather than being trained only once with pre-stored training data. Accordingly, the first neural network model 400 may be continuously updated while training is made.

In addition, the first neural network model 400 may include various neural network models as described above with reference to FIG. 2. For example, the first neural network model 400 may include an autoencoder. The detailed description thereof will be described below with reference to FIG. 9.

Figure 9:
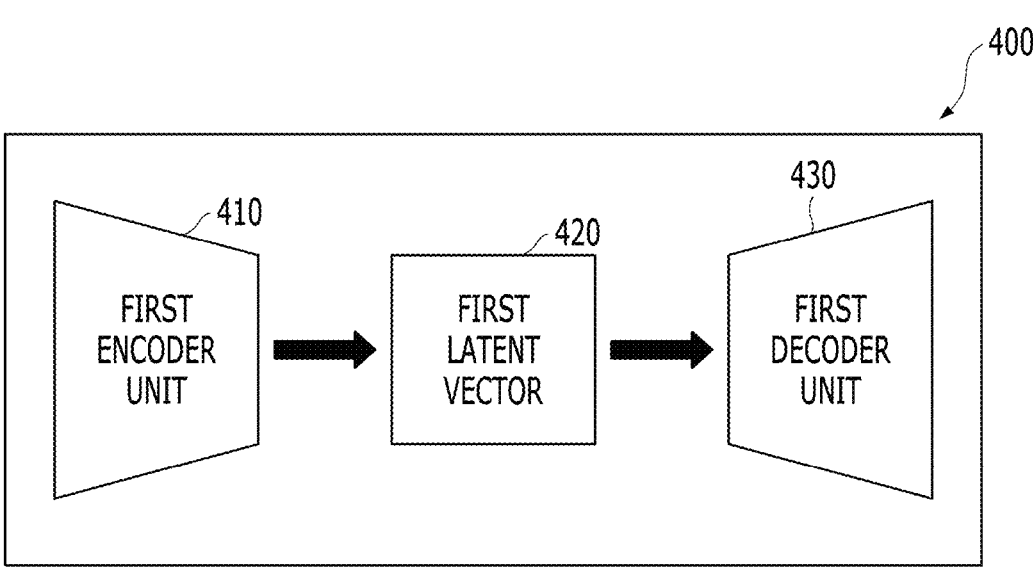
FIG. 9 is a block diagram for describing a first neural network model according to some embodiments of the present disclosure.

FIG. 9 is a block diagram for describing a first neural network model according to some embodiments of the present disclosure.

Referring to FIG. 9, the first neural network model 400 may include a first encoder unit 410, a first latent vector 420, and a first decoder unit 430.

The first encoder unit 410 may include a plurality of hidden layers, and may be inputted with traffic time interval data. The first encoder unit 410 may output a first latent vector 420 in which the dimension of the input traffic time interval data is reduced.

The first latent vector 420 may be a vector in which the traffic time interval data is reduced to a predetermined dimension through the first encoder unit 410.

The first decoder unit 430 may include the plurality of hidden layers, and may be input with the first latent vector 420. The first decoder unit 430 may extend the dimension of the input first latent vector 420 and output a first output vector having the same dimension as the traffic time interval data.

According to some embodiments of the present disclosure, the processor 110 may generate a loss value of the first neural network model 400 by comparing the traffic time interval data and the first output vector. In addition, the processor 110 may also determine whether the CAN message is anomalous by comparing the loss value of the first neural network model 400 with a predetermined threshold.

Referring back to FIG. 3, the second neural network model 500 may be trained using the normal payload analysis data extracted from the CAN message in the normal state through the preprocessing unit 300 as the training data. For example, the second neural network model 500 may be continuously trained based on new CAN messages continuously collected through the message collection unit 200, rather than being trained only once with pre-stored training data. Accordingly, the second neural network model 500 may be continuously updated while training is made.

In addition, the second neural network model 500 may include various neural network models as described above with reference to FIG. 2. For example, the second neural network model 500 may include the autoencoder. The detailed description thereof will be described below with reference to FIG. 10.

Figure 10:
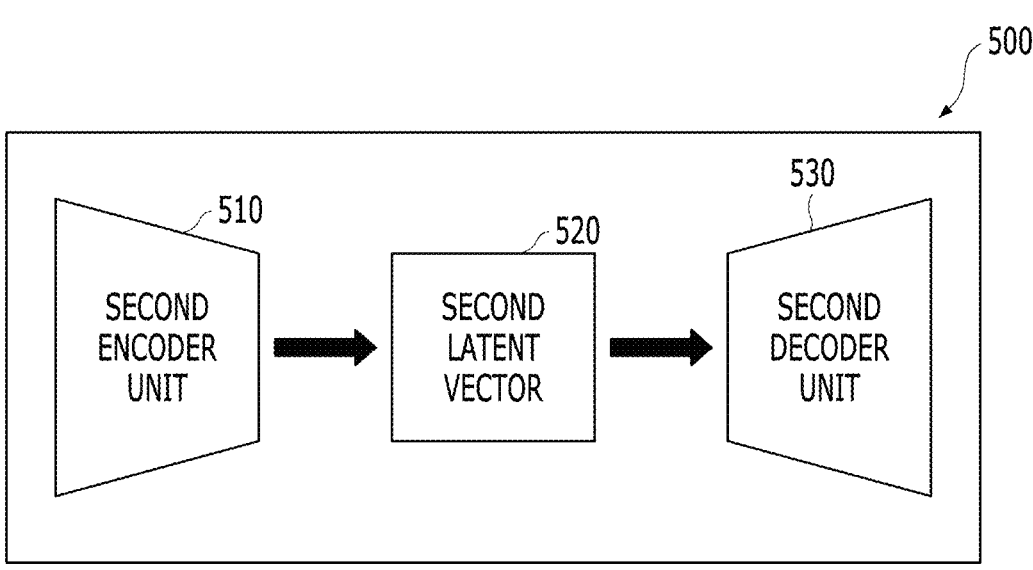
FIG. 10 is a block diagram for describing a second neural network model according to some embodiments of the present disclosure.

FIG. 10 is a block diagram for describing a second neural network model according to some embodiments of the present disclosure.

Referring to FIG. 10, the second neural network model 500 may include a second encoder unit 510, a second latent vector 520, and a second decoder unit 530.

The second encoder unit 510 may include the plurality of hidden layers, and may be inputted with payload data. For example, the payload analysis data may be input into the second encoder unit 510. The second encoder unit 510 may output the second latent vector 520 in which the dimension of the input payload analysis data is reduced.

The second latent vector 520 may be a vector in which the payload analysis data is reduced to a predetermined dimension through the second encoder unit 510.

The second decoder unit 530 may include the plurality of hidden layers, and may be input with the second latent vector 520. The second decoder unit 530 may extend the dimension of the input second latent vector 520 and output a second output vector having the same dimension as the payload analysis data.

According to some embodiments of the present disclosure, the processor 110 may generate a loss value of the second neural network model 500 by comparing the payload data and the second output vector. In addition, the processor 110 may also determine whether the CAN message is anomalous by comparing the loss value of the second neural network model 500 with a predetermined threshold.

Meanwhile, the processor 110 may generate merged data that merges the first latent vector generated by the first neural network model 400 and the second latent vector generated by the second neural network model 500.

Specifically, the processor 110 may generate a first adjusted latent vector in which a first weight is assigned to the first latent vector 420. The first weight may be determined based on a training result of the first neural network model 400 trained based on the traffic time interval data generated based on the normal CAN message.

The processor 110 may generate a second adjusted latent vector in which a second weight is assigned to the second latent vector 520. The second weight may be determined based on a training result of the second neural network model 500 trained based on the payload data generated based on the normal CAN message.

The processor 110 may generate merged data in which the first adjusted latent vector and the second adjusted latent vector are merged.

Referring back to FIG. 3, the third neural network model 600 may be trained using the merged data in which the first latent vector and the second latent vector are merged as the training data. Here, the first latent vector and the second latent vector may be generated using the data generated based on the normal CAN message.

For example, the third neural network model 600 may be continuously trained based on new CAN messages continuously collected through the message collection unit 200, rather than being trained only once with pre-stored training data. Accordingly, the third neural network model 600 may be continuously updated while training is made.

In addition, the third neural network model 600 may include various neural network models as described above with reference to FIG. 2. For example, the third neural network model 600 may include an adversarial autoencoder (AAE). The adversarial autoencoder as a model in which Variational Auto-Encoder (VAE) and Generative Adversarial Networks (GAN) are combined may be pre-trained so that a posterior distribution of a hidden code vector of the VAE matches a target distribution. A detailed description of the third neural network model 600 will be described later with reference to FIG. 11.

Figure 11:
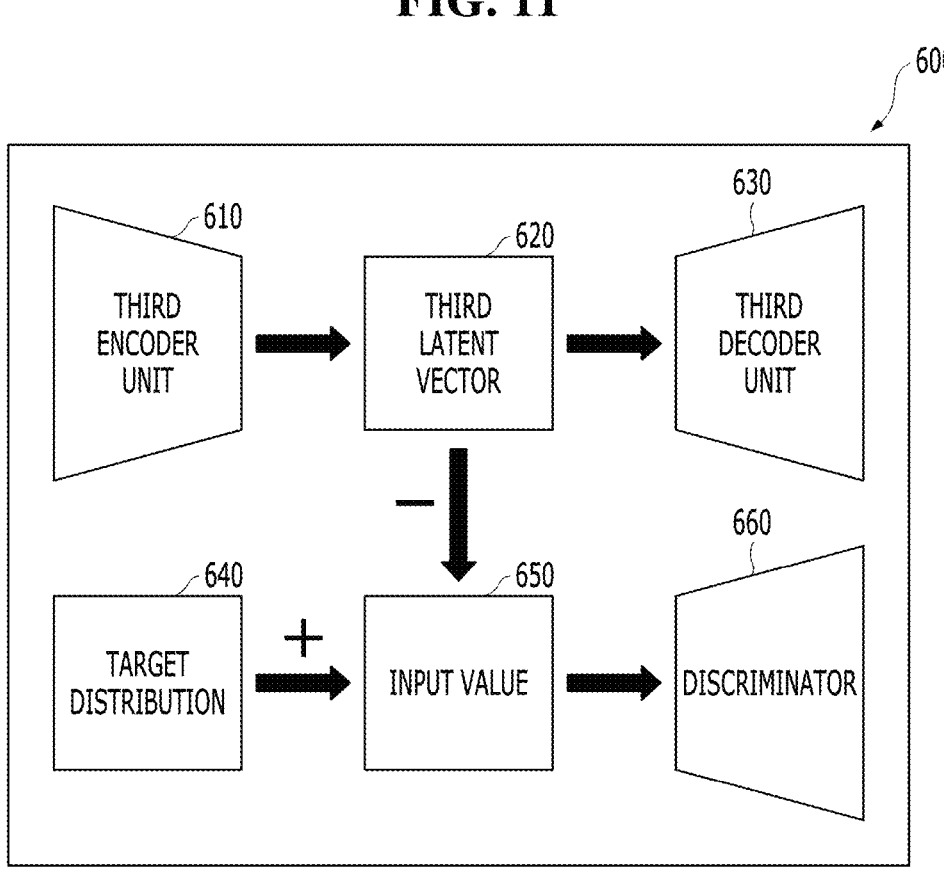
FIG. 11 is a block diagram for describing a third neural network model according to some embodiments of the present disclosure.

FIG. 11 is a block diagram for describing a third neural network model according to some embodiments of the present disclosure.

Referring to FIG. 11, the third neural network model 600 may include a third encoder unit 610, a third latent vector 620, a third decoder unit 630, a target distribution 640, an input value 650, and a discriminator 660. However, the above-described components are not essential for implementing the third neural network model 600, and the third neural network model 600 may have more or less components than the components listed above.

The third encoder unit 610 may include the plurality of hidden layers, and may be inputted with merged data. The third encoder unit 610 may output a third latent vector 620 in which the dimension of the input merged data is reduced.

The third latent vector 620 may be a vector in which the merged data is reduced to a predetermined dimension through the third encoder unit 610.

The third decoder unit 630 may include the plurality of hidden layers, and may be input with the third latent vector 620. The third decoder unit 630 may extend the dimension of the input third latent vector 620 and output first output data having the same dimension as the merged data. That is, the third decoder unit 630 may generate the first output data in which the third latent vector 620 is converted to a dimension before reduction.

The target distribution 640 may be a distribution that samples targeted pre-stored data.

The input value 650 may be a value generated by concatenating the third latent vector 620 and the target vector extracted from the target distribution 640. Here, the third latent vector 620 may have a '−' label, and the target vector may have a '+' label.

The discriminator 660 may receive the input value 650, and discriminate the received input value 650. For example, the discriminator 660 may be trained to output 1 in the case of the target vector and 0 in the case of the third latent vector 620. In addition, the third encoder unit 610 may be trained to make the output of the discriminator 660 to 1. Accordingly, the processor 110 may improve the performance of the third neural network model 600 by modifying the third latent vector 620 according to an intention.

According to some embodiments of the present disclosure, the discriminator 660 may generate second output data based on the target vector extracted from the target distribution 640, and the third latent vector 620.

The processor 110 may calculate a loss value of the third neural network model by comparing the merged data input into the third encoder unit 610 and the second output data generated by the discriminator 660.

The processor 110 may determine whether the CAN message is anomalous based on the loss value and a predetermined threshold. For example, when the loss value is larger than the predetermined threshold, the processor 110 may determine that the CAN message is anomalous.

Meanwhile, the processor 110 may correct the loss value of each of the first neural network model 400, the second neural network model 500, and the third neural network model 600.

First, the processor 110 may generate a first correction loss value using at least one of a mean absolute error, a mean square error, and/or a mean of loss values. The mean absolute error may be a method of converting loss values into absolute values and averaging the absolute values. The mean square error may be a method of squaring the loss value and averaging the squared loss value. The mean of the loss values may be a method of taking the mean of N frames from the loss values for N consecutive frames. Here, the frame may mean a time unit for receiving one CAN message.

Next, the processor 110 may generate a second correction loss value by inputting the first correction loss value into at least one of a moving average filter, a Gray Area Smoothing filter, and/or a Butterworth Approximation Low-Pass filter. The moving average filter may be a method of reducing noise components by averaging data by the size of a given time window. The moving average filter may be expressed as in Equation 1 below.

$$\bar{x}(t) = \frac{1}{T_w} \int_{t-T_w}^{t} x(\tau)d\tau \qquad \text{[Equation 1]}$$

Here, x(t) may represent input data (e.g., the first correction loss value, $\bar{x}(t)$ may represent output data (e.g., the second correction loss value), and $T_w$ may represent the time window. The Gray Area Smoothing filter may be a filter that reduces noise components by clearly modifying an unclear boundary. The Butterworth Approximation Low-Pass filter may be a filter that reduces noise components by flatly modifying a passband.

Meanwhile, the processor 110 may pre-train at least one of the first neural network model 400, the second neural network model 500, or the third neural network model 600. Accordingly, at least one of the first neural network model 400, the second neural network model 500, or the third neural network model 600 may be pre-trained.

The processor 110 may perform quantization to convert a floating point arithmetic process performed in at least one of the first neural network model 400, the second neural network model 500, or the third neural network model 600 into an integer arithmetic process. A detailed description thereof will be described below with reference to FIG. 12.

Figure 12:
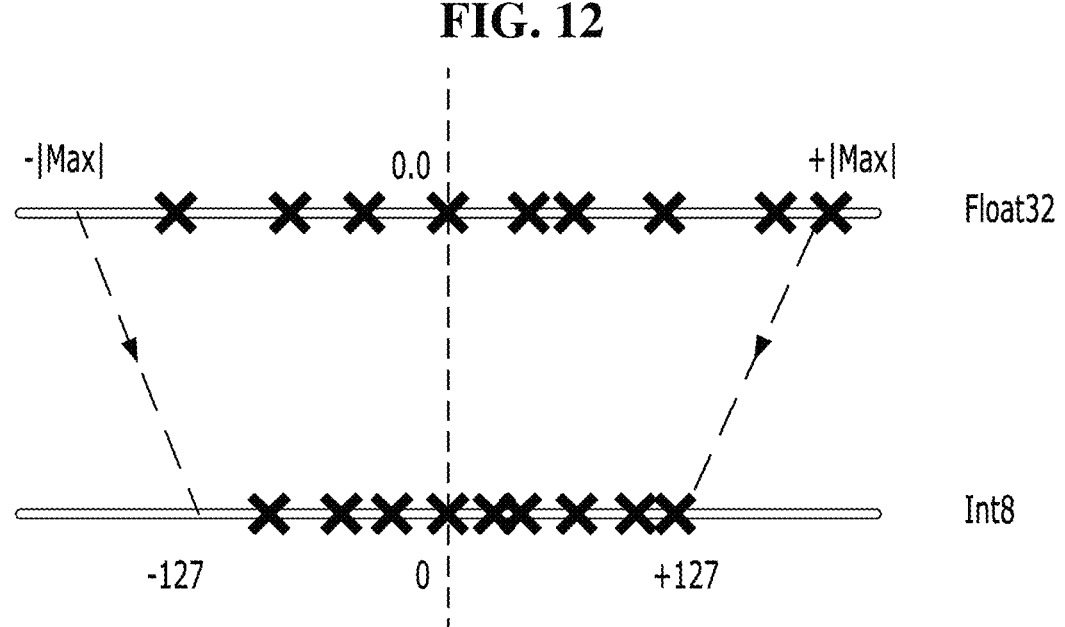
FIG. 12 is a diagram for describing quantization according to some embodiments of the present disclosure.

FIG. 12 is a diagram for describing quantization according to some embodiments of the present disclosure.

Referring to FIG. 12, the processor 110 may perform quantization pre-trained neural network models (e.g., the first neural network model 400, the second neural network model 500, the third neural network model 600, etc.). For example, the processor 110 may convert a floating point configured with 32 bits into an integer configured with 8 bits, which has a range between −127 and +127 in an arithmetic process performed on the pre-trained neural network models. That is, the processor 110 may convert the floating point configured with 32 bits into the integer configured with 8 bits, which has the range between −127 and +127 to simplify the weight values of the pre-trained neural network models, thereby achieving weight reduction.

As previously described with reference to FIGS. 1 to 12, the computing device 100 according to some embodiments of the present disclosure analyzes the contents of a CAN message in a normal state without any anomaly symptom in real time, and uses a feature extracted as a result of the analysis as the training data to train a neural network model (e.g., autoencoder).

Therefore, the computing device 100 according to some embodiments of the present disclosure is not dependent on the vehicle manufacturer and vehicle model, and does not require specific training data.

Further, the computing device 100 is capable of detecting the anomaly in real time by weight reduction. Accordingly, the computing device 100 does not require a lot of power or resources by the weight reduction, and may be used in CAN of various low-specification hardware.

Figure 13:
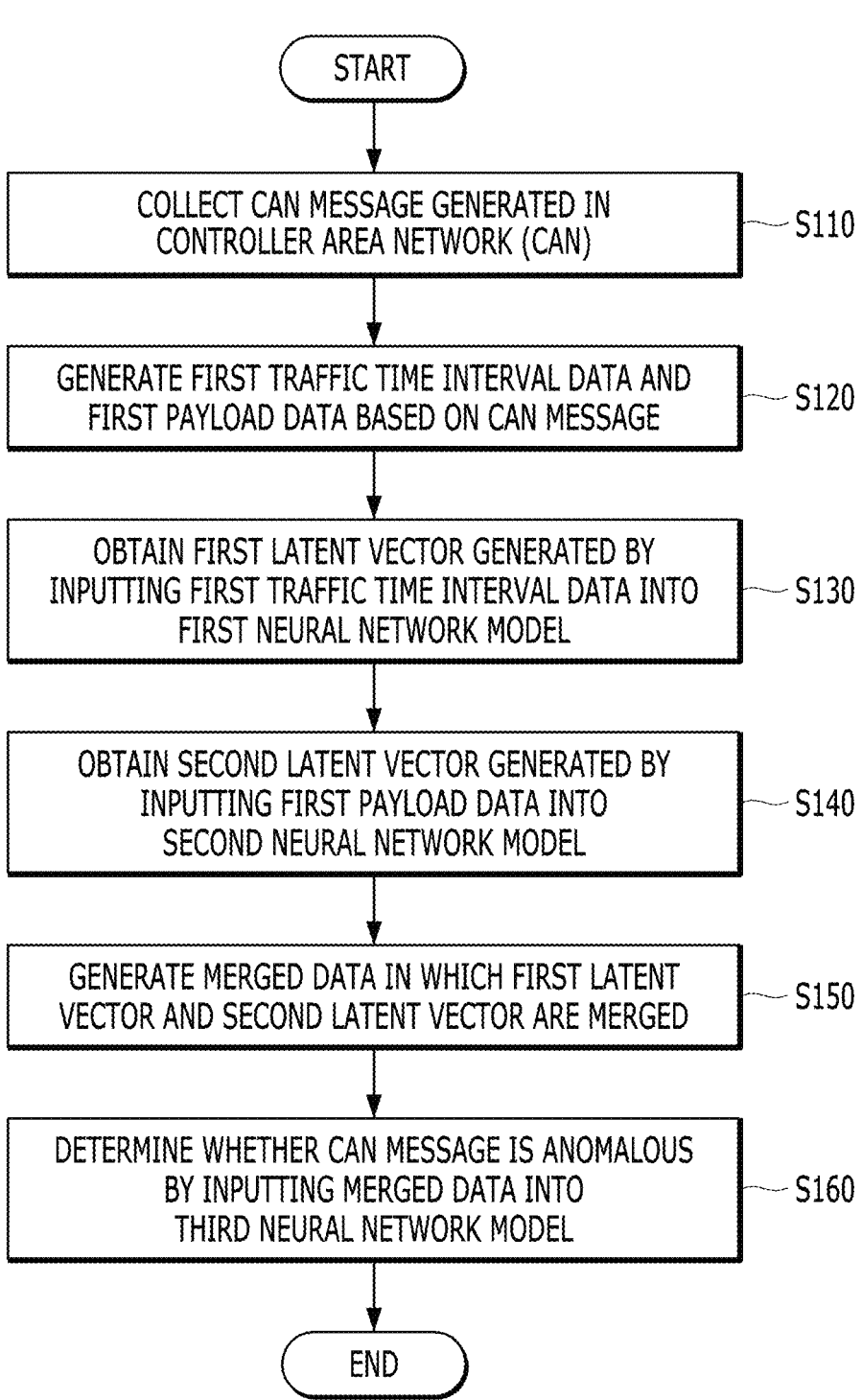
FIG. 13 is a flowchart for describing a method for detecting an anomaly, which is performed by a computing device according to some embodiments of the present disclosure.

FIG. 13 is a flowchart for describing a method for detecting an anomaly, which is performed by a computing device according to some embodiments of the present disclosure.

The processor 110 of the computing device 100 may collect a CAN message generated in a CAN (S110).

The processor 110 of the computing device 100 may generate first traffic time interval data and first payload data based on the CAN message (S120).

Here, according to some embodiments of the present disclosure, the processor 110 may extract an Arbitration ID from the CAN message.

The processor 110 may extract the value of the reception time interval of the CAN message from the CAN message.

The processor 110 may generate the first traffic time interval data including the Arbitration ID and the reception time interval value of the CAN message.

Here, according to some embodiments of the present disclosure, the processor 110 may extract the Arbitration ID from the CAN message.

The processor 110 may extract a payload from the CAN message.

The processor 110 may analyze the payload and generate payload analysis data. Here, the processor 110 may check the amount of change in the payload using at least one of Hamming Distance, Autocorrelation, or Time Series Decomposition. In addition, the processor 110 may analyze the amount of change in the payload and obtain payload separation information separated by use or unit. In addition, the processor 110 may generate payload analysis data including payload separation information.

Meanwhile, the processor 110 may generate first payload data including the arbitration ID and the payload analysis data.

The processor 110 of the computing device 100 may obtain a first latent vector 420 generated by inputting first traffic time interval data into a first neural network model 400 (S130).

The processor 110 of the computing device 100 may obtain a second latent vector 520 generated by inputting the first payload data into a second neural network model 500 (S140).

The processor 110 of the computing device 100 may generate merged data in which the first latent vector 420 and the second latent vector 520 are merged (S150).

Here, the processor 110 may generate a first adjusted latent vector in which a first weight is assigned to the first latent vector. The first weight may be determined based on a training result of the first neural network model 400 trained based on the traffic time interval data generated based on the normal CAN message.

In addition, the processor 110 may generate a second adjusted latent vector in which a second weight is assigned to the second latent vector. The second weight may be determined based on a training result of the second neural network model 500 trained based on the payload data generated based on the normal CAN message.

Further, the processor 110 may generate merged data in which the first adjusted latent vector and the second adjusted latent vector are merged.

The processor 110 of the computing device 100 may determine whether the CAM message is anomalous by inputting the merged data into a third neural network model 600 (S160).

The third neural network model 600 may include an encoder unit 610 that compresses the input merged data to generate a third latent vector with reduced dimension, a decoder unit 630 that generates first output data in which the third latent vector 620 is converted to a dimension before reduction, and a discriminator 660 that generates second output data based on a target vector extracted from a target distribution 640, and the third latent vector 620.

In addition, the third neural network model 600 as a model in which Variational Auto-Encoder (VAE) and Generative Adversarial Networks (GAN) are combined may be pre-trained so that a posterior distribution of a hidden code vector of the VAE matches a target distribution.

Meanwhile, the processor 110 may calculate a loss value of the third neural network model 600 by comparing the merged data and the second output data. In addition, the processor 110 may determine whether the CAN message is anomalous based on the loss value and a predetermined threshold.

In addition, processor 110 may pre-train at least one of the first neural network model 400, the second neural network model 500, or the third neural network model 600. Further, the processor 110 may perform quantization to convert a floating point arithmetic process performed in at least one of the first neural network model 400, the second neural network model 500, or the third neural network model 600 into an integer arithmetic process.

Steps illustrated in FIG. 13 are exemplary steps. Therefore, it will also be apparent to those skilled in the art that some of the steps of FIG. 13 may be omitted or there may be additional steps within a range without departing from a spirit scope of the present disclosure.

Further, specific contents regarding the components (reference numerals 100 to 600) disclosed in FIG. 13 may be replaced with the contents described through FIGS. 1 to 12 above.

Figure 14:
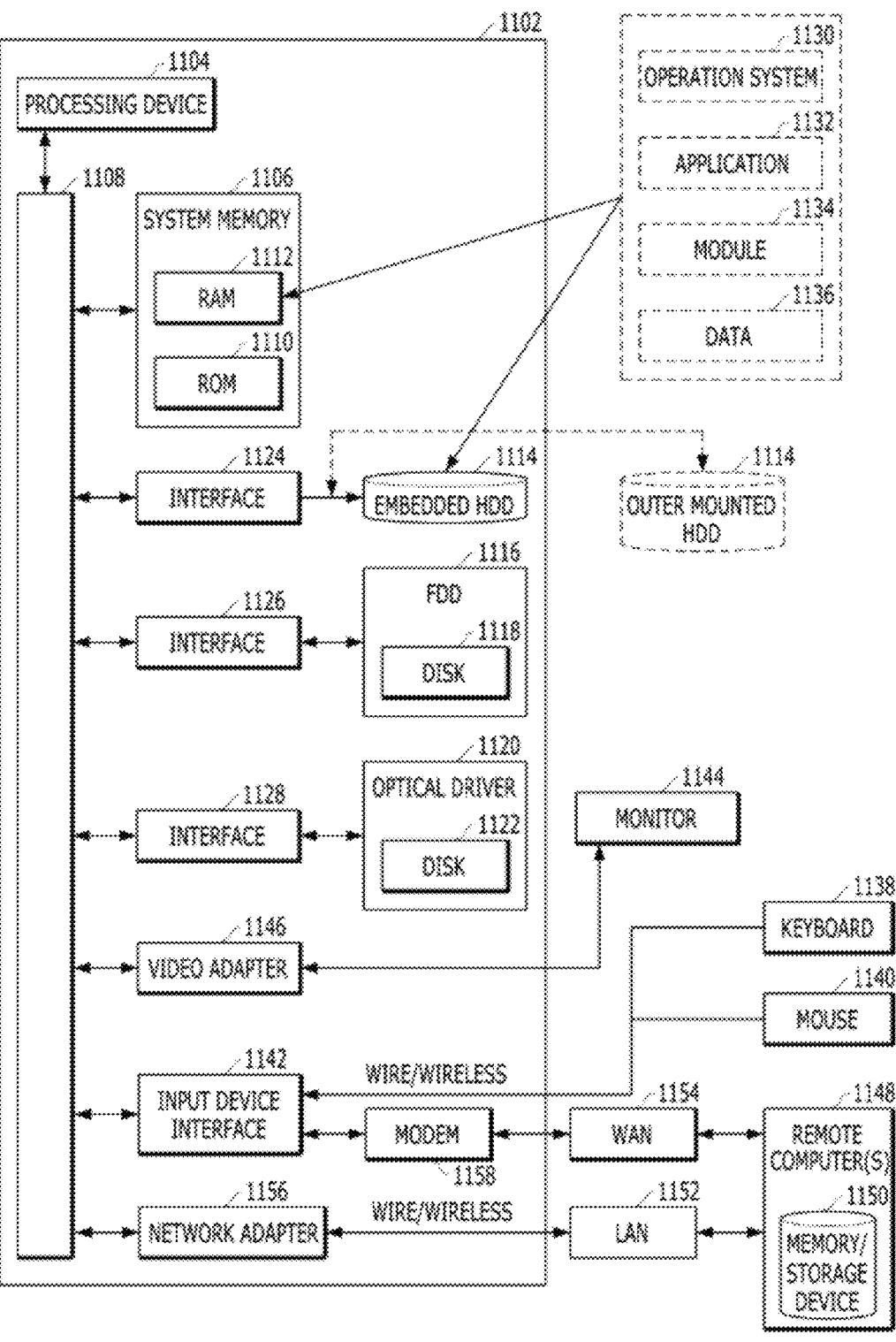
FIG. 14 illustrates a simple and general schematic view of an exemplary computing environment in which the embodiments of the present disclosure may be implemented.

FIG. 14 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means of setting a communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means of setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least three devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

MODE FOR INVENTION

Related contents in the best mode for carrying out the present disclosure are described as above.

INDUSTRIAL APPLICABILITY

The present disclosure may be used in a device, a system, etc., for performing anomaly detection.

The invention claimed is:

1. A method for detecting an anomaly, which is performed by a computing device including one or more processors, the method comprising:
    collecting a CAN message generated in a controller area network (CAN);
    generating first traffic time interval data and first payload data based on the CAN message;
    obtaining a first latent vector generated by inputting the first traffic time interval data into a first neural network model;
    obtaining a second latent vector generated by inputting the first payload data into a second neural network model;
    generating merged data in which the first latent vector and the second latent vector are merged; and
    determining whether the CAN message is anomalous by inputting the merged data into a third neural network model,
    wherein the generating of the merged data in which the first latent vector and the second latent vector are merged includes:
        generating a first adjusted latent vector in which a first weight is assigned to the first latent vector;
        generating a second adjusted latent vector in which a second weight is assigned to the second latent vector; and
        generating the merged data in which the first adjusted latent vector and the second adjusted latent vector are merged.

2. The method of claim 1, wherein the generating of the first traffic time interval data and the first payload data includes
    extracting an Arbitration ID from the CAN message,
    extracting a value of a reception time interval of the CAN message from the CAN message, and
    generating the first traffic time interval data including the Arbitration ID and the reception time interval value of the CAN message.

3. The method of claim 1, wherein the first weight is determined based on a training result of the first neural network model trained based on second traffic time interval data generated based on a normal CAN message.

4. The method of claim 1, wherein the second weight is determined based on a training result of the second neural network model trained based on second payload data generated based on the normal CAN message.

5. The method of claim 1, further comprising:
    wherein at least one of the first neural network model, the second neural network model, or the third neural network model is pre-trained,
    performing quantization of converting a floating point arithmetic process performed in at least one of the first neural network model, the second neural network model, or the third neural network model into an integer arithmetic process.

6. The method of claim 1, wherein the third neural network model as a model in which Variational Auto-Encoder (VAE) and Generative Adversarial Networks (GAN) are combined is pre-trained so that a posterior distribution of a hidden code vector of the VAE matches a target distribution.

7. The method of claim 1, wherein the generating of the first traffic time interval data and the first payload data includes
    extracting the Arbitration ID from the CAN message,
    extracting a payload from the CAN message,
    generating payload analysis data by analyzing the payload, and
    generating the first payload data including the Arbitration ID and the payload analysis data.

8. The method of claim 7, wherein the generating of the payload analysis data by analyzing the payload includes
    checking the amount of change in the payload using at least one of Hamming Distance, Autocorrelation, or Time Series Decomposition,
    obtaining payload separation information separated by use or unit by analyzing the amount of change in the payload, and
    generating the payload analysis data including the payload separation information.

9. The method of claim 1, wherein the third neural network model includes
    an encoder unit compressing the input merged data, and generating a third latent vector of which dimension is reduced,
    a decoder unit generating first output data in which the third latent vector is converted to a dimension before reduction, and
    a discriminator generating second output data based on a target vector extracted from a target distribution, and the third latent vector.

10. The method of claim 9, wherein the determining of whether the CAN message is anomalous by inputting the merged data into the third neural network model includes
    calculating a loss value of the third neural network model by comparing the merge data and the second output data, and
    determining whether the CAN message is anomalous based on the loss value and a predetermined threshold.

11. A non-transitory computer readable storage medium storing a computer program comprising instructions executed by a processor of a computing device for detecting an anomaly to perform the following steps, the steps comprising:
    collecting a CAN message generated in a controller area network (CAN);
    generating first traffic time interval data and first payload data based on the CAN message;
    obtaining a first latent vector generated by inputting the first traffic time interval data into a first neural network model;

obtaining a second latent vector generated by inputting the first payload data into a second neural network model;

generating merged data in which the first latent vector and the second latent vector are merged; and determining whether the CAN message is anomalous by inputting the merged data into a third neural network model, wherein the generating of the merged data in which the first latent vector and the second latent vector are merged includes:

generating a first adjusted latent vector in which a first weight is assigned to the first latent vector;

generating a second adjusted latent vector in which a second weight is assigned to the second latent vector; and generating the merged data in which the first adjusted latent vector and the second adjusted latent vector are merged.

12. A computing device for detecting an anomaly, comprising:

a processor including at least one core;

a memory for storing computer programs executable by the processor; and a network unit, wherein the processor is configured to collect a CAN message generated in a controller area network (CAN), generate first traffic time interval data and first payload data based on the CAN message, obtain a first latent vector generated by inputting the first traffic time interval data into a first neural network model, obtain a second latent vector generated by inputting the first payload data into a second neural network model, generate merged data in which the first latent vector and the second latent vector are merged, and determine whether the CAN message is anomalous by inputting the merged data into a third neural network model, wherein the processor is further configured to:

generate a first adjusted latent vector in which a first weight is assigned to the first latent vector;

generate a second adjusted latent vector in which a second weight is assigned to the second latent vector; and generate the merged data in which the first adjusted latent vector and the second adjusted latent vector are merged.

* * * * *